(12) United States Patent
McGuffin

(10) Patent No.: US 9,493,371 B1
(45) Date of Patent: Nov. 15, 2016

(54) BARGE WITH AERATION SYSTEM

(71) Applicant: Thomas R. McGuffin, Spanish Fort, AL (US)

(72) Inventor: Thomas R. McGuffin, Spanish Fort, AL (US)

(*) Notice: Subject to any disclaimer, the term of this patent is extended or adjusted under 35 U.S.C. 154(b) by 586 days.

(21) Appl. No.: 14/021,658

(22) Filed: Sep. 9, 2013

(51) Int. Cl.
*B01F 3/04* (2006.01)
*C02F 7/00* (2006.01)

(52) U.S. Cl.
CPC ...................... *C02F 7/00* (2013.01)

(58) Field of Classification Search
CPC combination set(s) only.
See application file for complete search history.

(56) References Cited

U.S. PATENT DOCUMENTS

| | | | |
|---|---|---|---|
| 4,448,689 A | 5/1984 | Von Nordenskjold |
| 5,228,998 A | 7/1993 | DiClemente et al. |
| 6,348,147 B1 | 2/2002 | Long |
| 6,478,964 B1 | 11/2002 | Redmon |
| 6,497,819 B1 | 12/2002 | Baba et al. |
| 7,520,493 B1 | 4/2009 | Haldane |
| 7,874,548 B1 | 1/2011 | McGuffin |
| 8,066,873 B2 | 11/2011 | Kaw |

*Primary Examiner* — Duane Smith
*Assistant Examiner* — Adam W Bergfelder
(74) *Attorney, Agent, or Firm* — George L Williamson

(57) ABSTRACT

Method and apparatus for a barge having an aeration system incorporated therein. A floatatable barge unit containing multiple built-in aerators wherein the barge has a ballast system which makes its draft variable. The unit is designed to draw fluid water from virtually any depth below the barge. Incorporated at various locations in the barge is an aeration system that includes aerators having a concave surface at the top of a fluid intake chamber for diverting aerated fluid away from the enclosure of the aerator.

10 Claims, 4 Drawing Sheets

BARGE WITH AERATION SYSTEM

BACKGROUND OF THE INVENTION

Field of the Invention

The present invention relates generally to barges and, more particularly, is concerned with a barge having an aeration system incorporated therein.

Description of the Related Art

Aeration systems related to barges have been described in the related art, however, none of the related art devices disclose the unique features of the present invention.

In U.S. Pat. No. 7,874,548 dated Jan. 25, 2011, McGuffin, the inventor of the present invention, disclosed a flotatable aeration system. In U.S. Pat. No. 4,448,689 dated May 15, 1984, Von Nordenskjold disclosed an apparatus for final clearing of wastewater. In U.S. Pat. No. 7,520,493, dated Apr. 21, 2009, Haldane disclosed a floating diffused air aerator. In U.S. Pat. No. 5,228,998 dated Jul. 20, 1993, DiClemente, et al., disclosed a floating biological contactor. In U.S. Pat. No. 8,066,873 dated Nov. 29, 2011, Kaw disclosed a floating bioreactor system. In U.S. Pat. No. 6,478,964 dated Nov. 12, 2002, Redmon disclosed a floating fine bubble aeration system. In U.S. Pat. No. 6,348,147 dated Feb. 19, 2002, Long disclosed a fluid flow system for floating biological contactor. In U.S. Pat. No. 6,497,819 dated Dec. 24, 2002, Baba, et al., disclosed a method and apparatus for treating wastewater.

While these aeration systems may be suitable for the purposes for which they were designed, they would not be as suitable for the purposes of the present invention as hereinafter described.

SUMMARY OF THE PRESENT INVENTION

The present invention discloses a barge having an aeration system incorporated therein. The present invention has a floatatable barge unit containing multiple built-in aerators wherein the barge of the present invention has a ballast system which makes its draft variable. The present invention is designed to draw water from virtually any depth. The aerators have a blower system for providing air to the aerators which blower system may be powered by an on-board portable diesel generator or powered by a diesel generator supplied by a small tugboat which may be used to maneuver the unit through the water. Incorporated in various locations in the barge is an aeration system that includes aerators having a concave surface at the top of a fluid intake chamber for diverting aerated fluid away from the enclosure of the aerator.

The aerators of the present invention are described in U.S. Pat. No. 7,874,548 dated Jan. 25, 2011 to McGuffin, the inventor of the present invention. U.S. Pat. No. 7,874,548, in a broad sense, discloses a method and apparatus for a floatatable aerator system comprising a hollow chamber supported by floats, the chamber having a concaved rear surface, a fluid intake chamber having a fluid inlet and a top aerated fluid diverter created by the concaved rear surface; a fluid aerator assembly for injecting air into fluid received through the fluid inlet to form aerated fluid; and, a bank of lateral outlet ports for expelling the diverted aerated fluid funneled along the concaved rear surface.

An object of the present invention is to provide an aerator disposed on a barge wherein the barge is an independently floatable unit. A further object of the present invention is to aerate the water under and around the barge. A further object of the present invention is to aerate the water around the barge so as to improve the water quality of the water in and about the barge. A further object of the present invention is to provide an aerated barge which can be easily used by an operator. A further object of the present invention is to provide an aerated barge which can be relatively easily and inexpensively manufactured.

Advantages of the present invention are that it is an environmentally friendly, green technology, non-invasive device/equipment using low pressure high volume air flow for maximum dissolved oxygen transfer in various water bodies. The present invention can be used in any body of water with a minimum depth of 48 inches, in which increased dissolved oxygen levels are required to mitigate environmental issues associated with poor water quality within our fragile ecosystem. Its mobile equipment/vessel/barge are scalable in size in order to accommodate virtually any size body of water and is designed to revitalize and restore all of our environmentally sensitive aquatic ecosystems that have been compromised by either man or mother nature.

Furthermore, the present invention is a floatable unit containing multiple built-in aerators and the water depth of the unit is controlled by a ballast system. The unit is designed to draw fluid from virtually any depth and can also be configured as a surface skimmer, removing and treating contaminants floating on or suspended within three feet of the fluid surface in which the unit is operating. The blowers which supply air flow to the aerators, can be powered by an on-board portable diesel generator or from power produced from generators supplied by a small tug boat which may be used to maneuver the unit through the water. The present invention may employ the use/injection of Ozone to further maximize oxygen transfer and to oxidize harmful elements found through the tainted water column. The present invention has the following uses: 1) environmental remediation; 2) coastal recovery; 3) increase of dissolved oxygen levels; 4) removal of heavy metals through oxidation; 5) reduction of BOD and COD; 6) enhance all aquatic life; and 7) de-stratification of large bodies of water. The benefits of the present invention are: 1) environmentally friendly; 2) no moving parts; 3) low maintenance; 4) mobile; 5) scalable in size; 6) can maneuver under its own power; and 7) can operate in water depths of four feet and deeper.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
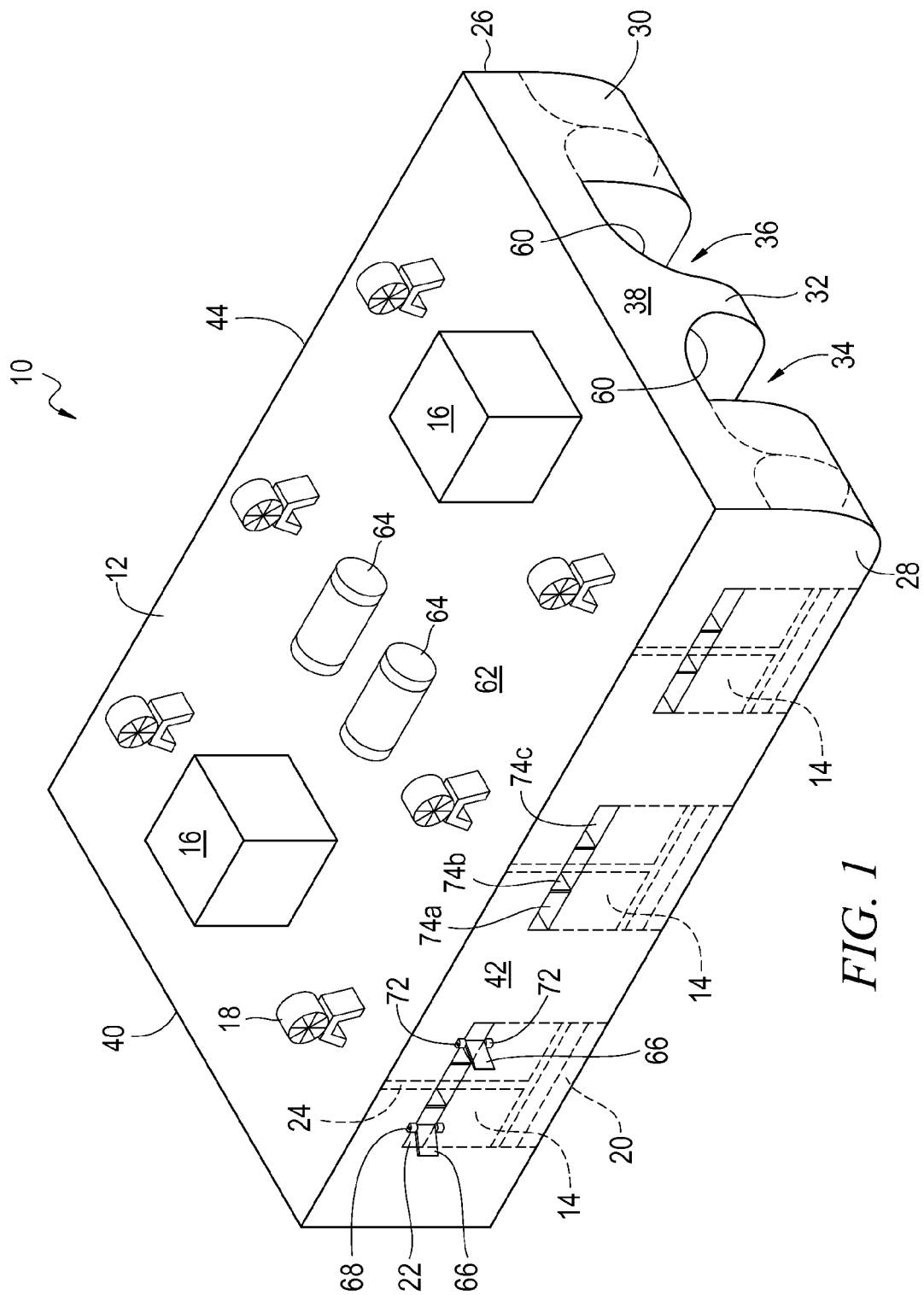
FIG. 1 is a perspective view of the present invention.

With regard to reference numerals used, the following numbering is used throughout the drawings.

10 present invention
12 barge
14 aerator
16 generator
18 blower
20 water intake
22 water discharge
24 diffuser air pipe
26 hull
28 first hull
30 second hull
32 middle hull
34 first tunnel-like space
36 second tunnel-like space
38 front end portion
40 rear end portion
42 first side portion
44 second side portion
46 water surface of water body
48 direction arrow
50 draft tube
52 bottom of water body
54 direction arrow
56 ballast
58 downward direction arrow
59 plate
60 curved portion of hull
61 upward direction arrow
62 deck
64 tank for fuel
66 rudder
68 clevis
70 axle
72 lock nut or gear drive
74a discharge port
74b discharge port
74c discharge port
76 chassis
78 aeration system
80 fluid
82 aeration diffuser
84 hollow chamber
86a top wall
86b front wall
86d bottom wall
88a end baffle wall
88b end baffle wall
88d interior baffle wall
90 fluid uptake chamber
92 arrow designating discharge water
94 air inlet port
98 central hollow chamber
100 concave back wall
102 baffle wall
104 wake or water discharge
106 ballast weight

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 7 illustrate the present invention wherein a barge having an aeration system is disclosed and which is generally indicated by reference number 10.

The following written description makes reference generally to all the FIGS. 1-7 and may reference specific Figures which will be indicated in the written description. Turning to FIG. 1, therein is shown the present invention 10 having a barge 12 having for illustration purposes only, a triangular shape, having mounted on each side thereof a plurality of aerators 14 (for more information see FIGS. 6 and 7 and discussion related thereto) wherein each aerator is powered by electricity from generator 16 which may be powered by, e.g., liquid natural gas (LNG) or diesel fuel, which provides electricity to a plurality of blowers 18 spaced about the upper surface of the deck 62 of the barge wherein each aerator 14 has a lower water intake 20, and an upper water outlet or discharge 22 wherein each aerator receives air from blowers 18 through interconnecting diffuser pipes 24. The hull 26 of the present invention 10 is a tri-hull type having outer hulls 28, 30 on either outer side and central hull 32 which together provide a first tunnel-like space 34 between an inner and outer hull on one side and a second tunnel-like space 36 between the inner and outer hull of the opposing side. The aerators 14 are mounted in the interior space on the inside of hulls 28, 30. It can be seen that each barge 12 generally has a front end portion 38 and rear end portion 40 along with a first side portion 42 and a second side portion 44. Also shown are a plurality of fuel tanks 64 on deck 62 along with a plurality of rudders 66 having one end mounted on a clevis 68 and axle 70 mechanism or the lie so that the rudder can be angularly pivoted for steerage and locked in position in the wake or discharge outflow 104 (best seen in FIG. 7) from an aerator 14 so as to steer the barge 12 through the water 46. Due to the high volume of discharge produced by each aerator 14, there is enough force to propel the barge 12 through the water 46. The rudders 66 could be positioned at an operator chosen angle and locked in position using a lock nut or gear drive 72, or the like, on one or both ends of an axle 70 as would be done in the standard manner by one skilled in the art. Note that while only two rudders 66 are shown for illustration purposes, additional rudders could be mounted on additional aerators 14 as deemed appropriate by the operator. The position of the rudder 66 with respect to the barge 12 can be controlled manually or by remote GPS. Also shown is the discharge 22 of each aerator 14 partitioned into three portions or discharge ports 74a, 74b and 74c. Also, a concave shaped portion 60 on each outer side of the middle hull portion 32 is shown which is used to affect the direction of water flow to and from the aerators 14.

Figure 2:
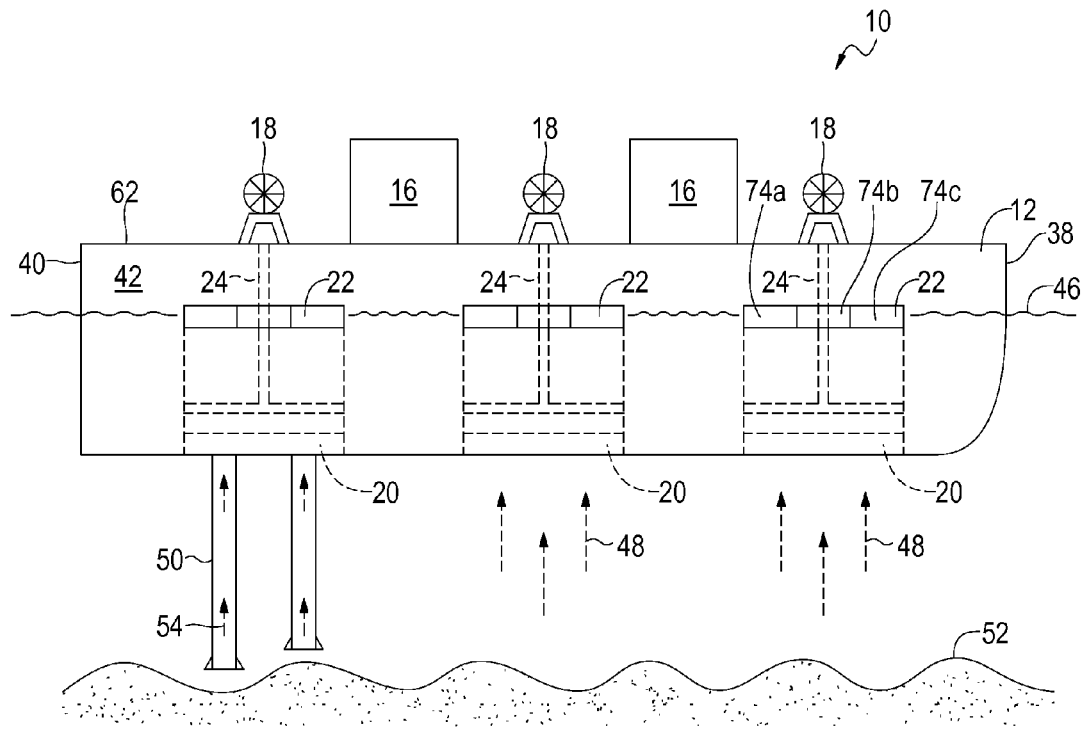
FIG. 2 is a side elevation view of portions of the present invention.

Turning to FIG. 2, therein is shown the present invention 10 having a barge 12 having mounted on each side thereof a plurality of aerators 14 wherein each aerator is powered by electricity from generator 16 which provides electricity to a plurality of blowers 18 spaced about the upper deck 62 of the barge wherein each aerator 14 has a water intake 20, and a water outlet 22 and wherein each aerator receives air from blowers 18 by means of interconnecting air diffuser pipes 24. It can be seen that each barge 12 generally has a front portion 38 and rear portion 40 along with a first side portion 42. While the barge 12 shown in FIG. 2 is rectangular in shape, it would be understood by one skilled in the art that the barge of the present invention 10 could have many other shapes. Also shown is barge 12 floating on the water surface 46 of the water body. Also shown are direction arrows 48 showing the direction of the water flowing upwardly through the water body toward each aerator 14. Also shown are a plurality of optional downwardly extending draft tubes 50 through which water may be drawn directly into an aerator 14 from near the bottom 52 of the water body also showing a direction arrow 54 showing the water flowing upwardly through the draft tubes toward the aerator 14. The aerators 14 of the present invention 10 may or may not be equipped with the draft tubes 50. Also shown are discharge ports, 74a, 74b and 74c.

Figure 3:
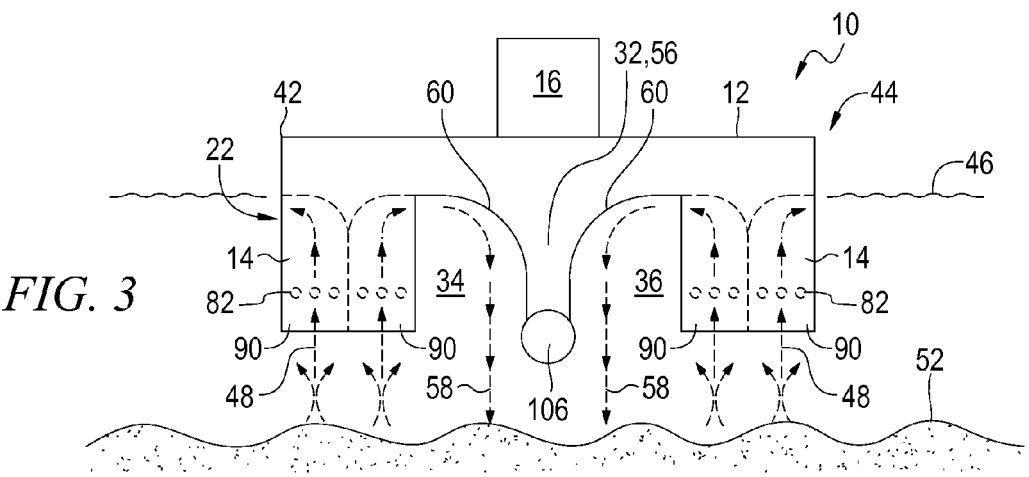
FIG. 3 is a front elevation view of the present invention.
Figure 4:
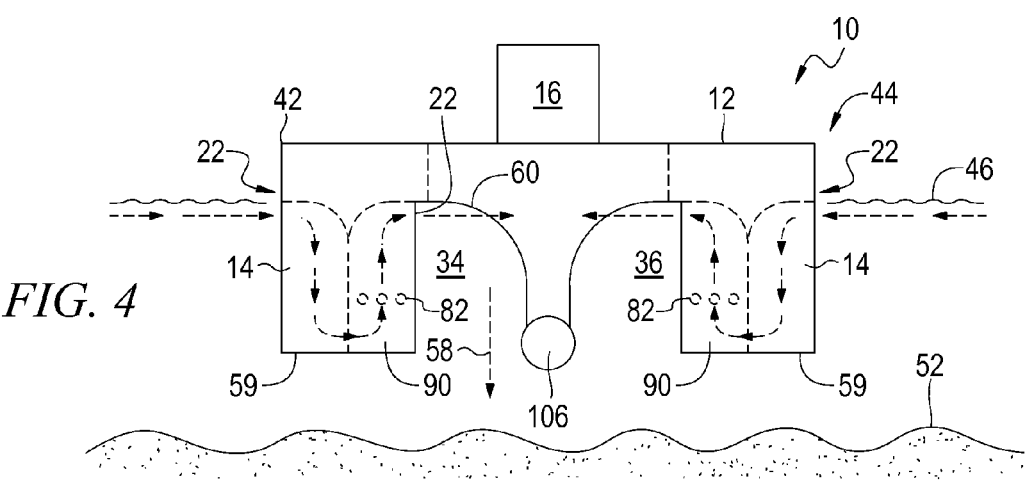
FIG. 4 is a front elevation view of the present invention.
Figure 5:
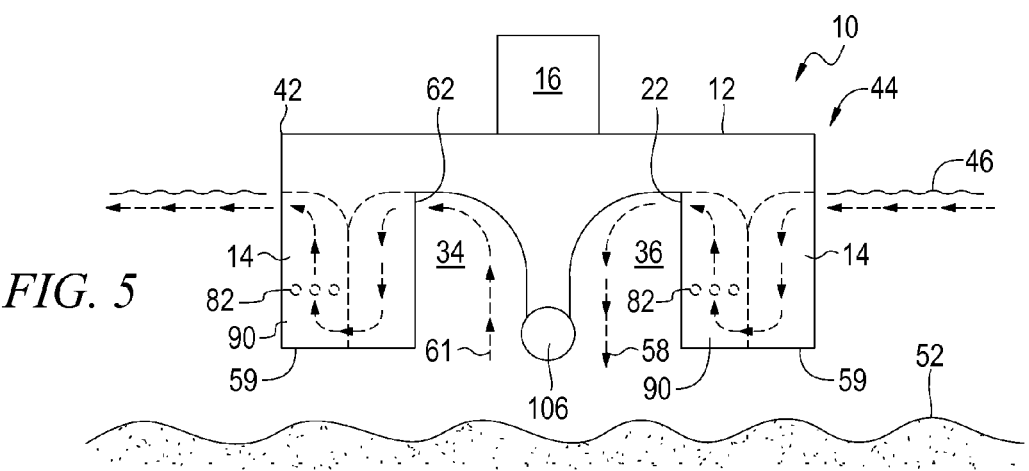
FIG. 5 is front elevation view of the present invention.

Turning to FIGS. 3 through 5, therein generally are shown various water flow patterns which can be created and used with the present invention 10. These water flow patterns are generally indicated by direction arrows and are created by making structural modifications to the aerators 14 of the present invention 10 to cause water to flow in various directions through the aerators. The structural modifications include placement of an optional plate 59 on the lower end of the aerators 14 to close off a portion of the aerator and/or alternative placement or relocation of aeration diffusers 82 to force the flow of water in the user selected direction.

Turning to FIG. 3, therein is shown the present invention 10 wherein each aerator 14 is being discharged outwardly at 22 shown on the first side 42 and the second side 44 with direction arrows 48 showing the water intake upwardly due to the force supplied by the air being emitted from the aeration diffusers 82 which causes water flow upwardly as shown by arrows 48. The aerators 14 are mounted in the interior space inside the outer hulls 28, 30 of the barge 12. Shown are the aerators 14 on each of the outward sides having a discharge outwardly away from the barge 12 with the discharge duct on the inside of the aerator forcing water to be discharged toward the central hull 32 and then downwardly due to the curved surface 60 which surface is formed into the central hull of the barge 12. The central hull 32 also has a ballast tank 56 therein which may contain water ballast or other fluid to vary the depth of the barge 12 in the water body 46 or its draft. Note that the downward direction arrow 58 shows the water being discharged downwardly toward the bottom 52 of the water body. Tunnel-like spaces 34, 36 extend entirely from the front to the rear of barge 12 and each has a curved surface 60 on its inner wall for directing the flow of water. Also shown on the lower end portion of the central hull 32 is an optional conventional ballast weight 106 which may be attached to the hull to add ballast and may include a steel tube filled with concrete or the like.

Turning to FIG. 4, therein are shown the aerators 14 on the left and right sides 42 and 44 having the outer water intakes force the water in from near the upper surface 46 of the water body using the outer discharge duct 22 which occurs because its bottom intake is closed off with a plate 59 to force water to discharge from the inner discharge portion 22 toward the curved surface 60 and then downwardly toward the bottom 52 of the water body as shown by direction arrows 58 due to the curved hull 60. The aeration diffusers 82 are disposed only in the interior fluid uptake chambers 90 which also helps produce the flow pattern shown in FIG. 4.

Turning to FIG. 5, therein is shown the present invention 10 having its aerators on the first side 42 and second side 44 of the barge 12 wherein an aerator 14 on the first side 42 has its bottom intake shut off with plate 59 so that water flows upwardly as shown by upward direction arrow 61 from the space or tunnel 34 to an inlet in its upper portion on the inside shown at 62 so that the water can discharge on the outside 42 away from the barge as shown by arrow 64. The air diffusers 82 are disposed only in the exterior fluid uptake chamber 90. On side 44 of the barge 12 the water flow is shown coming from the outer surface 46 toward the aerator 14 through and back up the aerators being discharged at its discharge 22 downwardly as shown by downward discharge arrow 58 which shows that the flow in the water is towards the bottom 52 of the water body. The air diffusers 82 are disposed only in the interior fluid uptake chamber 90.

The aerators 14 illustrated in this specification are described and disclosed in U.S. Pat. No. 7,874,548, dated Jan. 25, 2011, to Thomas R. McGuffin, the inventor of the present invention. However, it is expected that it would be possible to also incorporate other types of aerators into the design and embodiments of the present invention. The discussion related to FIGS. 6 and 7 presents a more detailed discussion of the aerators 14.

Figure 6:
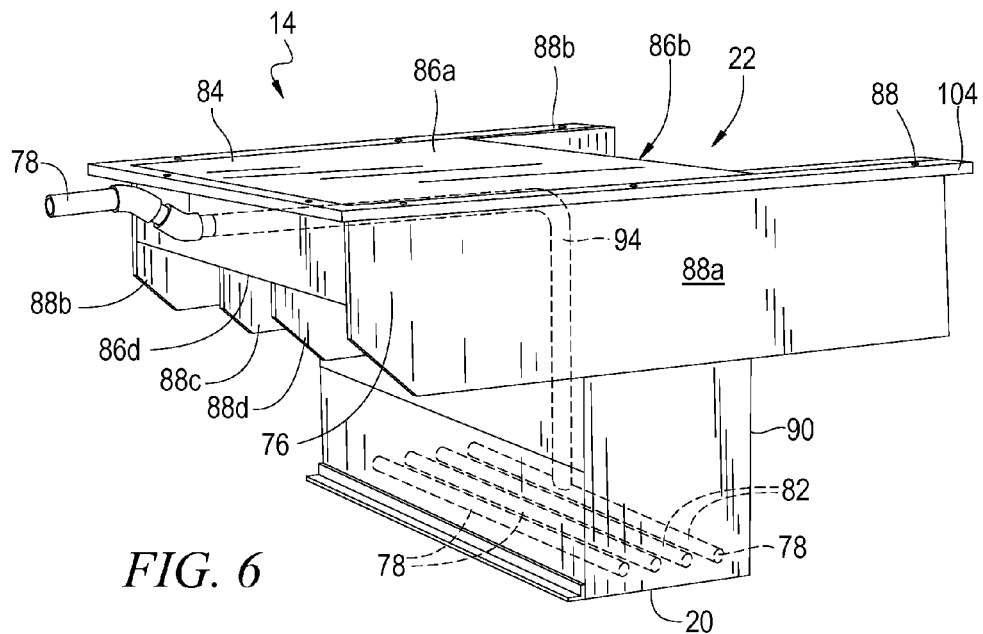
FIG. 6 is perspective view of one embodiment of an aeration unit of the present invention.
Figure 7:
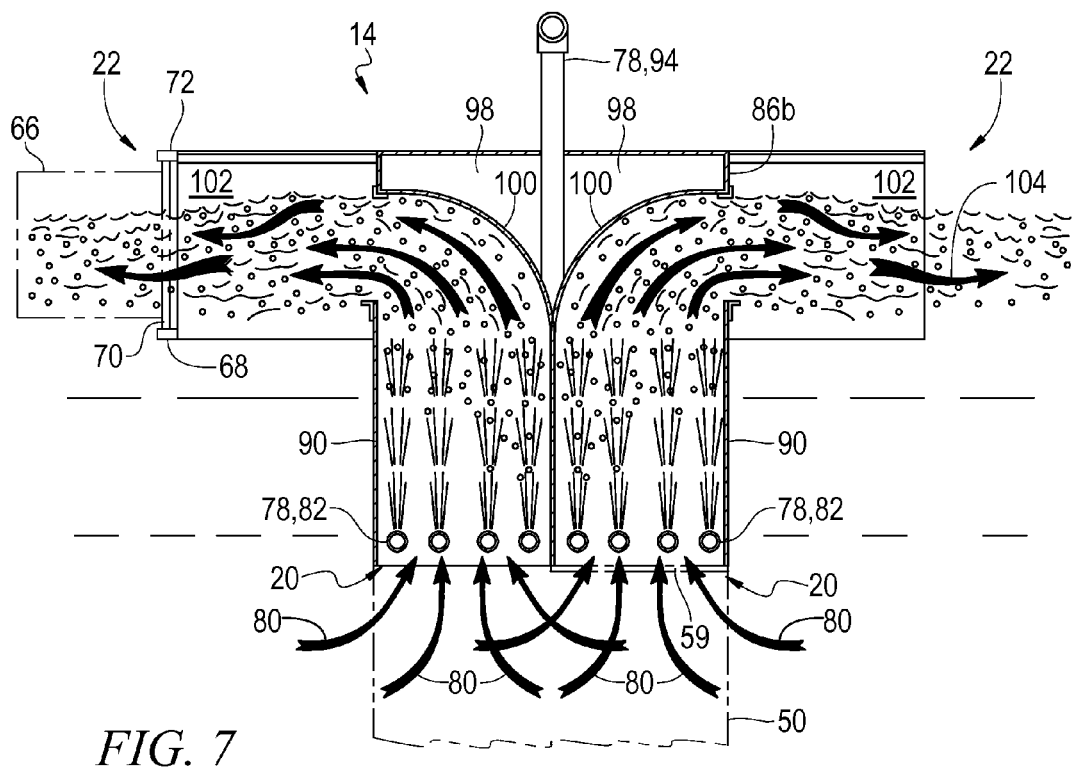
FIG. 7 is a cross sectional view of a second embodiment of an aeration unit of the present invention.

Turning to FIGS. 6 and 7, FIG. 6 shows aerators 14 having a single uptake 20 and a single discharge 22, and, FIG. 7 shows aerators 14 having double inlets 20 and double discharges 22. FIG. 7 shows the aerators 14 expected to be used with the present invention 10, however, FIG. 6 is necessary to more fully explain certain elements of the structure and function of the aerators 14. Furthermore, the single uptake/discharge aerators 14 shown in FIG. 6 may be used with the present invention 10 by placing the aerators in an alternating fashion longitudinally along the hull of the barge 12 so that the discharge 22 of one aerator is disposed in a first direction and then in an opposite direction on the next adjacent aerator.

Turning to FIG. 6, therein is disclosed an aerator 14 having a single inlet or uptake 20 and a single discharge 22 which aerator is comprised of a floatatable chassis-like enclosure 76 having an aerating system 78 coupled thereto, the aerating system 78 aerating water or fluid 80 (best shown in FIG. 7) flowing through the aerator chassis 76. Also shown are the air diffusers or outlets 82. The floatatable chassis 76 increases the buoyancy of the barge 12 of the present invention 10, however, the extra buoyancy is not expected to be required because the barge is expected to have sufficient buoyancy independent of the chassis 76. The air diffusers 82 have a plurality of apertures or outlets disposed thereon which have various diameters so that both fine (less than 3.5 mm) and coarse (greater than 4 mm) diameter air bubbles are produced. Also the present invention 10 can be used to inject ozone, hybrid ozone with hydroxyl radicals, carbon dioxide, and various other gases to accomplish various chemical reactions within the fluid stream or water body 46, or, in a situation where by there is an anaerobic fluid body, we would inject carbon dioxide through the blowers instead of oxygen; also, ozone can be injected through the blowers to reduce BOD, COD, oxidize volatile organic compounds, pharmaceuticals, heavy metals, hydro-carbons, and many other compounds found through out the water body. By using a unique or varying combination of size and number of coarse and fine air bubbles the density of the water 80 inside of the aeration chamber 90 can be changed which allows the present invention 10 to retrieve or reject various materials or substances. By changing or varying the combination of air bubbles, the density of the water 80 inside the chamber 90 can be changed making it possible to, e.g., retrieve concentrated patches of oil located on the floor of the gulf. By incorporating the draft tubes 50, the present invention 10 can operate in water depths over 1,000 feet and can target specific materials with specific gravity weights located beneath several feet or layers of e.g., waste water lagoon sludge. The present invention 10 can target these specific materials, process them within the chamber 90, and neutralize them through oxidation either naturally aspirated or with the injection of hybrid ozone or by using advanced oxidation processing.

The floatable aerator chassis 76 has a side profile that resembles a "T"-shape (see FIG. 6) and a top view that resembles a "U"-shape (see FIG. 6). The flotatable aerator chassis 76, which has its own floatatable characteristics independent of the barge 12, comprises an upper hollow chamber 84 bounded by a top wall 86a, front wall 86b, a concaved back wall 100, (elements 86b and 100 are best seen in FIG. 7) and a bottom wall 86d. The hollow chamber 84 is supported by a plurality of baffle walls 88a, 88b, 88c and 88d. The two end baffle walls 88a, 88b serve as side walls for the hollow chamber 84 and extend past both the length and depth of the hollow chamber 84. The interior baffle walls 88c, 88d extend the length of the hollow chamber 84. Additional means for flotation (not shown), in the form of air cavities or flotation material, is disposed on the inside of the chassis 76.

The aerator chassis 76 further includes a fluid uptake chamber 90 having a fluid intake port or inlet 20 for intaking fluid 80 from beneath the chassis and a discharge port or outlet 22 located between baffle walls 88a, 88b. The opening of the fluid uptake chamber 90 is displaced approximately 90 degrees with respect to the openings of the discharge 22 which is further divided into apertures or ports 74a, 74b, 74c (see FIGS. 1 and 2).

The discharge port 74a, 74b, 74c shares the concaved back wall 100 of the hollow chamber 84 to funnel or divert water between the two end baffle walls 88a, 88b. The concaved back wall 100 provides approximately a 90 degree elbow for the flow of aerated water in the uptake chamber 90 directly to the bank of discharge ports 74a, 74b, 74c. Arrows 104 show the wake or water discharge. As can be readily seen the extended end baffle walls 88a, 88b create a semi-enclosed area or pool wherein aerated water collects there-inbetween.

The aerator system 78 comprises an air inlet port or conduit 94. The inlet port 94 is adapted to be coupled to a flexible hose which is coupled to an air or other oxygen source 18 (see FIGS. 1 and 2) as would be done in the standard manner by one skilled in the art. The air inlet conduit 94 conveys air to the plurality of air diffusers 82 inside and near the lower end of fluid uptake chamber 90 forming air jets which force air directly in the path of fluid 80 so that the rising air bubbles create a forceful pattern of fluid flow from beneath the chassis 76 upwardly and out the discharge apertures or ports 74a, 74b, 74c.

The aerating system 78 receives fluid or water 80 up through the inlet port 20 (as shown by arrows at 80) where the fluid is subjected to air jet streams from a plurality of air diffusers 82. The fluid or water 80 is thus aerated and forced upward through the chassis 76 where the fluid diverter in the form of concaved back wall 100 funnels or diverts the aerated fluid out through discharge port 74a, 74b, 74c. In one embodiment, the uptake chamber 90 is approximately in the center of the length of the two end baffle walls 88a, 88b. The flotatable aerator 14 is disposed in the water so that an upper portion of the hollow chamber 84 remains above water and, preferably, the inlet port 20 remains above the subterranean earth disposed on the bottom 52 of a pond, reservoir, bay, river or like water body.

By way of general explanation, the aerators 14 require an anchoring system for attachment to the barge 12 of the present invention 10 as would be done in the standard manner by one skilled in the art so as to maintain their position relative to the surface of the water, otherwise they could move in the water. Suitable mounting means could include brackets, flanges and/or straps, or the like. The floating capability of aerator 14 may be due to lightweight floatatable PVC, top hollow chamber, or other similar flotation devices.

Turning to FIG. 7, therein is shown a cross-sectional view of an alternative embodiment for an aerator 14 expected to be used with the present invention 10 having oppositely disposed or directed double water discharges 22, however, in most other respects this embodiment is similar to the previous embodiment shown in FIG. 6 of aerator 14. Also shown are centrally disposed hollow chamber 98, fluid 80, two concaved walls 100, two baffle walls 102, two inlet ports 20, two fluid uptake chambers 90, two aerating systems 78 and multiple sets of air diffusers 82. Also shown on aerator 14 in phantom line are an exemplary rudder 66, axle 70, clevis 68 and lock nut or gear drive 72 along with plate 59 disposed on only one intake 20 and the draft tube 50 disposed on both intakes 20.

Figure 8:
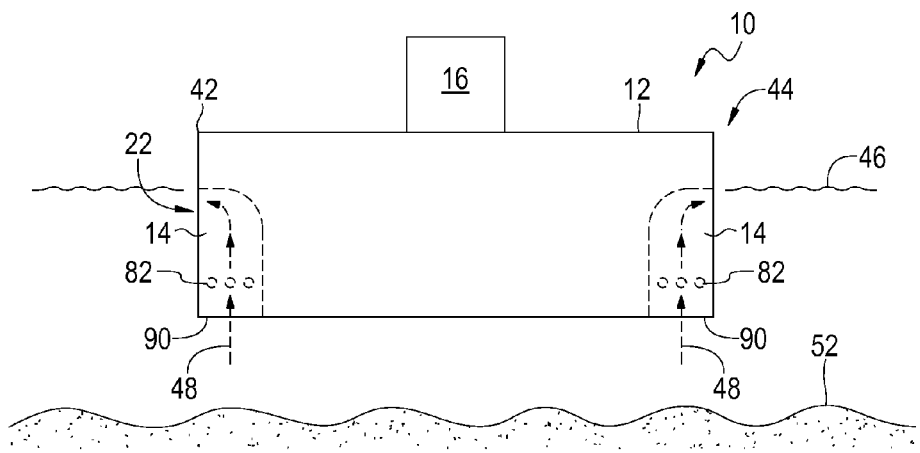
FIG. 8 is a front elevation view of an alternative embodiment of the present invention.

Turning to FIG. 8, therein is shown an alternative embodiment of the present invention 10 wherein the barge 12 is a conventional flat bottom barge, e.g., a work barge, not being of the tri-hull type. The aerators are mounted in the interior space inside the barge 12 hull 26 on the outer edges of the sides 42, 44. Each aerator 14, which is of the type illustrated in FIG. 6, is being discharged outwardly at 22 shown on the first side 42 and the second side 44 with direction arrows 48 showing the water intake upwardly due to the force supplied by the air being emitted from the aeration diffusers 82 which causes water flow upwardly as shown by arrows 48. Shown are the aerators 14 on each of the outward sides having a discharge outwardly away from the barge 12. Other previously disclosed elements are also shown.

The present invention 10 can be further summarized generally as a device for aerating a body of water 46 being a barge 12 adapted for floating on the body of water having a hull 26 having a portion disposed below a waterline in the conventional manner with a concave surface 60 extending longitudinally along the hull so that the concave surface has a portion disposed below the waterline; at least one aerator 14 disposed on the barge for aerating the body of water wherein the aerator has an upper portion and a lower portion with a water inlet 20 disposed on the lower portion of the aerator for receiving water from the water body, a water outlet 22 disposed on the upper portion of the with an air diffuser assembly 82 for injecting air into the water received through the water inlet to form aerated water 104; wherein the water outlet diverts aerated water away from the aerator in substantially a horizontal plane after the water leaves the aerator; and, wherein the concave surface and the aerator are disposed an effective distance from each other so that the concave surface is capable of directing a flow of water toward or away from the aerator. Further, a plurality of aerators may be spaced apart the barge. Further, there is a system for supplying air 16, 18, 24, 78, and 94 to the air diffuser assembly, wherein the system for supplying air to the air diffuser assembly is disposed on the barge. Also, there may be at least one draft tube 50 disposed on the water inlet of the aerator having a lower end portion that receives water from a point remote to the water inlet. Further, the aerator may have comprises first and second water inlets 20 and first and second water outlets 22 wherein the first and second water outlets divert aerated water in opposite directions relative to each other. Also, the air diffuser assembly is adapted to provide both fine and coarse air bubbles. Further, the water outlet diverts aerated water away from the barge with sufficient force to propel the barge through the body of water. Also, a rudder is disposed on the barge for steering the barge through the body of water wherein the rudder is disposed in the water discharge 104 of the aerator for steering the barge through the body of water. Also, there is a ballast tank disposed in the hull of the barge to vary the draft of the barge. Further, the hull is substantially a tri-hull having a centrally disposed hull 32 and first and second outer hulls 28, 30 so that the concave surfaces 60 are disposed on the first and second outer side portions of the central hull.

I claim:

1. A method for aerating a body of water, comprising the steps of:
  a) providing a self-powered barge adapted for controlled movement on the body of water, the barge having a hull, the hull having multiple spaced longitudinally extending portions including first and second outer hull portions with at least one inner hull portion, each of said outer hull portions having an outer surface, a fluid containing ballast tank on a bottom end of said inner hull portion, and said hull extending below a waterline;
  b) providing a concave surface in a portion of the hull located between adjacent hull portions, the concave surface extending longitudinally along the hull, the concave surface having a portion disposed below the waterline;
  c) providing at least one aerator on the barge in one of said outer hull portions for aerating the body of water, the aerator having an upper portion and a lower portion;
  d) providing a water inlet on the lower portion of the aerator for receiving water from the water body, said concave surface directing water flow, and providing a water outlet on said outer surface of the upper portion of the aerator;
  e) injecting air into the water received through the water inlet to form aerated water;
  f) diverting aerated water away from the aerator in substantially a horizontal plane after the water leaves the aerator using a rudder attached to said water outlet for using aerated water to provide steerage for the barge; and
  g) adjusting fluid level in said ballast tank on the bottom end of said inner hull portion to vary the draft of said barge.

2. The method of claim 1, further comprising the steps of providing a plurality of aerators spaced apart about the barge.

3. The method of claim 1, further comprising the step of providing a system for supplying air to an air diffuser assembly of said aerator, wherein the system for supplying air to the air diffuser assembly is disposed on the barge.

4. The method of claim 1, further comprising the step of providing at least one draft tube on the water inlet of the aerator, the draft tube having a lower end portion, wherein the lower end portion of the draft tube receives water from a remote point adjacent a bottom of said body of water.

5. The method of claim 1, further comprising the step of providing first and second water inlets and first and second water outlets on the aerator, wherein the first and second outlets divert the aerated water in opposite directions relative to each other.

6. The method of claim 3, wherein the air diffuser assembly is adapted to provide air bubbles having diameters in the range of 3.5 to greater than 4 mm.

7. The method of claim 1, diverting aerated water away from the barge with sufficient force to propel the barge through the body of water.

8. The method of claim 1, further comprising the step of positioning said rudder by remote GPS.

9. The method of claim 4, in which multiple draft tubes of different lengths are provided to obtain water inlet in more than one location in said body of water.

10. The method of claim 1, wherein the hull of the barge is a tri-hull having a centrally disposed hull and first and second outer hulls, the central hull having first and second outer side portions, wherein the concave surface is disposed on each first and second outer side portions of the central hull.

* * * * *